United States Patent [19]

Nagae et al.

[11] 4,400,059

[45] Aug. 23, 1983

[54] LIQUID CRYSTAL DISPLAY DEVICE

[75] Inventors: Yoshiharu Nagae, Hitachi; Tetsuo Ito, Mito; Masaaki Kitajima, Hitachi; Hideaki Kawakami, Mito; Fumio Nakano, Hitachi; Hidetoshi Abe, Katsuta; Masato Isogai, Hitachi; Michio Ooue, Hitachi; Akio Mukoh, Hitachi, all of Japan

[73] Assignee: Hitachi, Ltd., Tokyo, Japan

[21] Appl. No.: 261,033

[22] Filed: May 6, 1981

[30] Foreign Application Priority Data

May 9, 1980 [JP] Japan .................................. 55-60575

[51] Int. Cl.³ ........................ G02F 1/133; C09K 3/34; G02F 1/13
[52] U.S. Cl. .............................. 350/332; 252/299.01; 252/299.1; 350/349
[58] Field of Search .................... 252/299.1; 350/349, 350/332

[56] References Cited

U.S. PATENT DOCUMENTS

| | | | |
|---|---|---|---|
| 3,877,017 | 4/1975 | Kawakami et al. | 350/332 |
| 4,143,947 | 3/1979 | Aftergut et al. | 252/299.7 |
| 4,241,344 | 12/1980 | Kmetz et al. | 350/349 |
| 4,252,417 | 2/1981 | Scheffer et al. | 350/349 |
| 4,257,682 | 3/1981 | Suzuki et al. | 350/349 |
| 4,278,328 | 7/1981 | Mukoh et al. | 350/349 |
| 4,281,902 | 8/1981 | Kmetz et al. | 350/349 |
| 4,281,903 | 8/1981 | Gharadjedaghi | 252/299.1 |
| 4,291,949 | 9/1981 | Wada et al. | 350/349 |

FOREIGN PATENT DOCUMENTS

| | | | |
|---|---|---|---|
| 2658568 | 7/1977 | Fed. Rep. of Germany | 252/299.1 |
| 54-59160 | 5/1979 | Japan | 350/349 |
| 55-25005 | 2/1980 | Japan | 252/299.1 |

OTHER PUBLICATIONS

Aftergut, S., et al., SID 77 Digest, pp. 68–69 (1977).
Gharadjedaghi, Mol. Cryst. Liq. Cryst., vol. 68, pp. 127–135 (1981).
White, D. L., et al., J. Appl. Physics, vol. 45, No. 11, pp. 4718–4723 (1974).
Cox, R. J., Mol. Cryst. Liq. Cryst., vol. 55, pp. 1–32 (1979).
Scheffer, T. J., et al., "Guest-Host Displays," Liquid Crystal Devices, Sprokel, G. Edit., Plenum Press, N.Y., pp. 173–198 (1980), presented at Symposium on Physics and Chemistry of L. C. Devices, IBM, San Jose, Calif., Feb. 7–8, 1979.

Primary Examiner—Teddy S. Gron
Attorney, Agent, or Firm—Antonelli, Terry & Wands

[57] ABSTRACT

A color liquid crystal display device wherein a nematic liquid crystal to which a dichroic dye and an optically active substance have been added is used as the liquid crystal layer and the amount of said optically active substance added is so selected as to fall in a range making steep the threshold voltage characteristics of the liquid crystal.

6 Claims, 6 Drawing Figures

LIQUID CRYSTAL DISPLAY DEVICE

This invention relates to a liquid crystal display device capable of giving a color display wherein there is used a nematic liquid crystal having a negative dielectric anisotropy to which a dichroic dye has been added.

A liquid crystal display device is a device having a liquid crystal held between a pair of base plates at least one of which is transparent wherein, by applying a predetermined voltage to electrodes formed on each of the facing surfaces of the two base plates, the liquid crystal molecules are electrooptically changed to display images, letters or the like in accordance with the shape of electrodes to which the voltage has been applied.

In such a liquid crystal display device, a color display can be given by adding to the liquid crystal a dichroic dye having the first absorption spectrum in the direction parallel to the axial direction of the dye molecule and the second absorption spectrum different from the first absorption spectrum in the direction perpendicular thereto so that the direction of the molecular axis of the dichroic dye at the time when voltage is applied is different from that at the time when voltage is not applied. This will be explained by way of FIG. 1 illustrating the prior art. In FIGS. 1a and 1b, 1 and 2 are one pair of base plates which are placed so as to face each other at a definite distance, and 3 and 4 are electrodes respectively formed on each of the facing surfaces of base plates 1 and 2. A nematic liquid crystal having a negative dielectric anisotropy to which a dichroic dye and an optically active substance have been added is held between the pair of base plates 1 and 2. The liquid crystal molecule and the dichroic dye molecule are indicated by 5 and 6, respectively. When no voltage is applied to the electrodes 3 and 4, the liquid crystal molecule 5 and the dye molecule 6 are so oriented that their axial direction makes a right angle with base plates 1 and 2, based on the perpendicular orientation treatment given to the surfaces of the base plates 1 and 2 and the electrodes 3 and 4. In this state, the direction of the light passing the apparatus is parallel to the axial direction of the dichroic dye molecule, and the liquid crystal shows a color determined by the first absorption spectrum of the dichroic dye. Next, when a voltage sufficiently higher than the threshold voltage of the liquid crystal is applied to the electrodes 3 and 4, the liquid crystal molecule 5 and the dye molecule 6, both placed between the electrodes 3 and 4, change their direction of orientation so that their axial directions become parallel to the base plates 1 and 2. At this time, if the liquid crystal contains an optically active substance, the liquid crystal molecule 5 and the dye molecule 6 are so oriented that the axial directions of the molecules become parallel to the base plates 1 and 2, and they have a spiral structure around the axis perpendicular to the base plates 1 and 2 (grandjean state), as shown in FIG. 1b. In this state, the light passing the apparatus has a direction perpendicular to the axis of the dichroic dye, and the liquid crystal placed between the electrodes 3 and 4 shows a color determined by the second absorption spectrum of the dichroic dye, while the liquid crystal not placed between the electrodes 3 and 4 show a color determined by the first absorption spectrum of dichroic dye similarly to the case of FIG. 1a. Accordingly, there can be obtained a so-called color liquid crystal display in which images or letters conforming to the shape of electrodes to which voltage is applied are distinguishably indicated by the colors determined by the first and second absorption spectra. Most of dichroic dyes hitherto known have the first absorption spectrum hardly absorbing any visible light in the direction parallel to the long axis of the dye molecule and the second absorption spectrum absorbing a light of particular wavelength in the visible region in the direction perpendicular thereto. Therefore, in color liquid crystal display devices using a dichroic dye, the displayed image is usually constructed of a combination of two states—a colored state and a transparent state.

In such liquid crystal display devices, the brightness changes with a voltage applied in the manner shown in FIG. 1c. Thus, when the voltage applied is lower than threshold voltage Vth, no change occurs in the orientation of liquid crystal molecules, so that the state of FIG. 1a is retained where the liquid crystal is not colored, keeps transparent and therefore looks bright. If the voltage applied exceeds the threshold voltage Vth, the orientation of liquid crystal molecules changes to bring about a colored state where the liquid crystal looks dark. The coloration becomes deeper with an increasing voltage applied. If a voltage applied is increased further, the change in coloration becomes smaller and smaller, until it reaches a saturation.

On the other hand, in order to drive a liquid crystal display device, it is necessary to apply a voltage to arbitrarily selected image elements (consisting of pairs of facing electrodes and the liquid crystal included therebetween) which have been selected successively at a considerable speed from many image elememts placed side by side. A greater area of displayed image requires an increased number of image elements and a more ingenious method of driving. As a preferable method of driving, there is known a combination of time division driving method and voltge averaging method (U.S. Pat. No. 3,877,017). This driving method is advantageous in that the number of external connection terminals can be reduced compared with that in the static driving method, the so-called cross talk, i.e. the phenomenon that a voltage is applied to the liquid crystal residing between the selected electrodes to bring the liquid crystal into a state of driving, can be eliminated, and a low voltage driving becomes possible. The voltage averaging method is a driving method wherein the ratio of the applied voltage $V_{on}$ for the image elements (constituted of electrode pairs and liquid crystal residing therebetween) to be displayed to the applied voltage $V_{off}$ for the image elements not to be displayed, i.e. $\alpha = V_{on}/V_{off}$, is always kept constant. This voltage ratio $\alpha$ is not so great a value in general and approximately expressed by the following equation:

$$\alpha = \sqrt{\frac{N + (a + 1)(a - 1)}{N + (a - 1)(a - 3)}} = 1.73$$

under such conditions that duty ratio $1/N = \frac{1}{4}$ and bias ratio $1/a = \frac{1}{3}$. When the number of display image elements further increases and the duty ratio more decreases, the value of $\alpha$ becomes further smaller. As is understandable from FIG. 1c, the magnitude of $\alpha$ determines the contrast of displayed image, i.e. the ratio of the brightness of image element at the time when voltage applied is $V_{off}$ ($B_{off}$) to the brightness of image element at the time when voltage applied is $V_{on}$ ($B_{on}$), i.e., $CR = B_{off}/B_{on}$. As mentioned above, when a liquid crystal display device is driven by the time division driving method using voltage averaging method, it is difficult to control or improve the contrast of displayed image because the contrast is nearly automatically determined by the duty ratio and the bias ratio. It is considered that color liquid crystal display devices are also similar regarding this point.

An object of this invention is to provide a color liquid crystal display device in which an improvement in the contrast of displayed image is aimed at.

Another object of this invention is to provide a color liquid crystal display device suitable for the time division driving using the voltage averaging method.

The characteristic feature of the liquid crystal display device of this invention resides in that the ratio d/P between the thickness of liquid crystal layer (d) and the pitch of liquid crystal in cholesteric state (P) is designed to fall in a range giving steep threshold voltage characteristics of the device. The term "threshold voltage characteristics of the device" means the relation between the applied voltage and the brightness shown in FIG. 1c in the range that brightness decreases beyond the threshold voltage $V_{th}$. According to experiments of the present inventors, it was verified that the threshold voltage characteristics become steep when d/P was in the range of 0.6-1.0. When the threshold voltage characteristics are steep, $B_{off}/B_{on}$ can be increased under the same values of duty ratio and bias ratio. That is, according to this invention, a color liquid crystal display device having a displayed image of high contrast can be realized.

Concretely, the liquid crystal display device of this invention is so constructed that a liquid crystal layer is held between a pair of base plates having a plurality of electrodes on their facing surfaces, at least the electrode parts of the two base plates contacting with the liquid crystal layer have a function of orienting the liquid crystal molecules so that their long axis makes a right angle with the electrode surface, the liquid crystal layer is formed by one or more nematic liquid crystals having a negative dielectric anisotropy containing a dichroic dye and an optically active substance, and the ratio d/P between the thickness of liquid crystal layer (d) and its pitch in cholesteric state (P) falls in the range of 0.6-1.0.

In this invention, it is necessary to orient the liquid crystal molecules so that the direction of their long axis makes a right angle or an approximately right angle with the electrode surface or the base plate surface in the state that no voltage is applied between the electrodes which includes such states that a voltage not higher than the threshold voltage is applied. Such an orienting function can be given to the electrodes by coating an organic silicon compound such as dimethyldichlorosilane or polymethylphenylsiloxane either to the surfaces of the electrodes when the orienting function is to be given only to the electrode parts or to the whole surface of the base plates and electrodes contacting with liquid crystal layer when the orienting function is to be given to the whole surface of base plates and electrodes contacting with the liquid crystal layer, or by treating said surface with lecithin, fluroine type surfactant, phosphoric acid type surfactant or the like.

As the nematic liquid crystals having a negative dielectric anisotropy, there can be used the following compounds:

(1) 4,4'-methoxybutyl-azoxybenzene,
(2) 4,4'-ethoxybutyl-azoxybenzene,
(3) 4-methoxyphenyl-4'-pentylbenzoate,
(4) 4-ethoxyphenyl-4'-pentylbenzoate,
(5) 4-ethoxyphenyl-4'-n-pentylcyclohexylcarboxylate,
(6) 4-pentyloxyphenyl-4'-n-pentylcyclohexylcarboxylate,
(7) 4-propyloxyphenyl-4'-n-pentylcyclohexylcarboxylate,
(8) 4-methoxybenzylidene-4'-butylaniline,
(9) 4-ethoxybenzylidene-4'-butylaniline,
(10) 4-butoxy-2,3-dicyanophenyl-4'-n-pentylcyclohexylcarboxylate,
(11) 4-pentyloxy-2,3-dicyanophenyl-4'-n-pentylcyclohexylcarboxylate, and the like. In accordance with purposes, several kinds of liquid crystal materials may be used as a mixture.

Examples of the dichroic dyes usable in this invention include the followings:

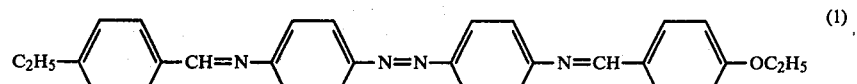

(1)

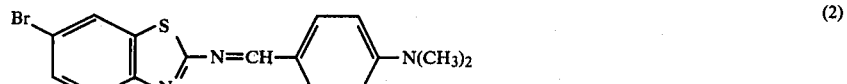

(2)

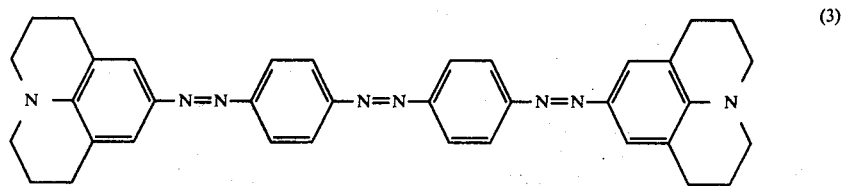

(3)

-continued
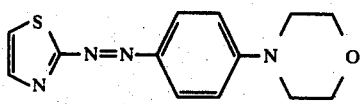 (4)
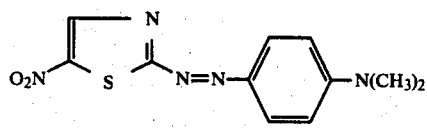 (5)
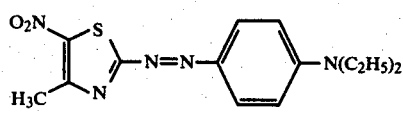 (6)
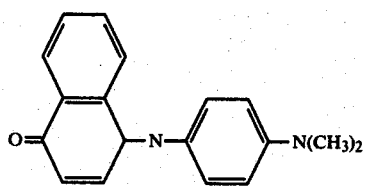 (7)
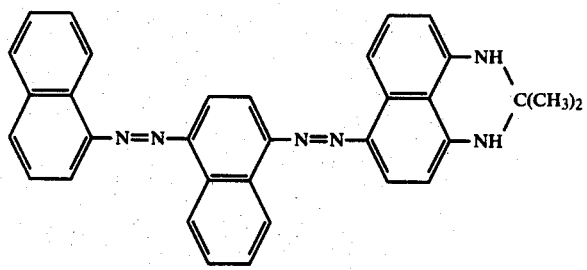 (8)
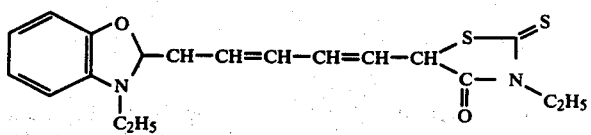 (9)
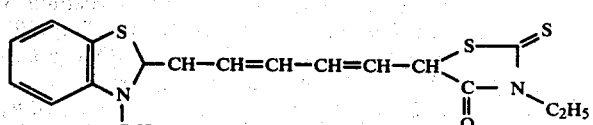 (10)
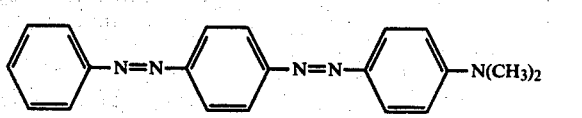 (11)
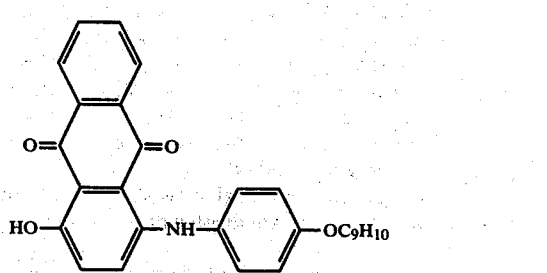 (12)

-continued

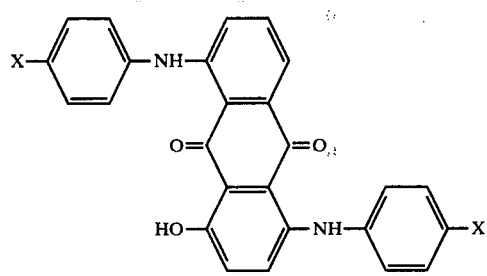

X = —C₂H₅

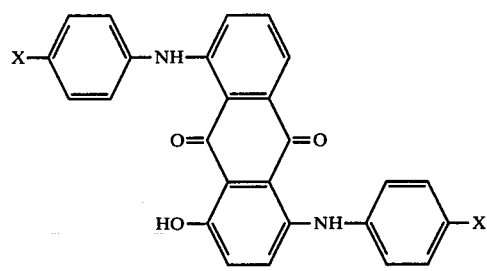

X = —OC₅H₁₁

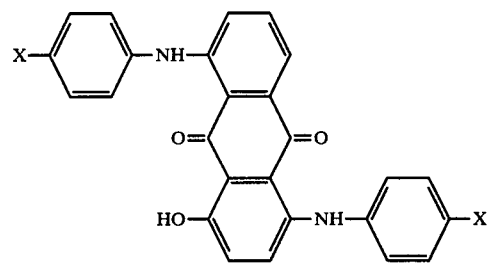

X = —N(CH₃)₂

These dyes can be selected with consideration of the miscibility with liquid crystals, the order parameter S, the wavelength of maximum absorption, etc. Though the amount of the dye to be added is not limited, it is preferably in the range of 0.5–5% by weight based on the total weight of the liquid crystal layer.

Further, as the optically active substances usable in this invention, there are chiral nematic compounds obtained by introducing an optically active group such as a 2-methylbutyl group, 2-methylbutoxy group, 3-methylpentyl group, 3-methylpentoxy group, 4-methylhexyl group, 4-methylhexoxy group or the like into a nematic liquid crystal. Further, alcohol derivatives such as l-menthol, d-borneol and the like, ketone derivatives such as d-camphor, 3-methylcyclohexanone and the like, carboxylic acid derivatives such as d-citronellic acid, l-camphoric acid and the like, can also be used. These optically active substances act so as to change the pitch P of the liquid crystal in cholesteric state. Said optically active substances are added in an amount necessary for giving the d/P ratio, i.e. the ratio between the thickness of liquid crystal layer (d) and the pitch of liquid crystal in cholesteric state (P), of 0.6–1.0. Accordingly, the threshold voltage characteristics can be improved and a color liquid crystal display device excellent in contrast of displayed image can be obtained by adding an appropriate amount of optically active substance.

In this invention, the pitch P of liquid crystal in cholesteric state can be determined by the use of "wedge-shaped cell" in the same manner as in the method of Cano [R. Cano: Bull. Soc. Fr. Mineral Cristallogr., 91, 20 (1974)] or in the method of Matsumura [Ouyou Butsuri, 43, 125 (1974)]. Brightnesses $B_{on}$ and $B_{off}$ under applied voltages of $V_{on}$ and $V_{off}$ can be determined by measuring the light quantity passing through the device by means of Brightness Spotmeter (manufactured by Photo Research Co., USA) by using a tungsten lamp as a light source.

Other objects and characteristic features of this invention will become apparent from the descriptions given in the following examples.

This invention will be explained concretely with reference to Examples.

EXAMPLE 1

Figure 1A:
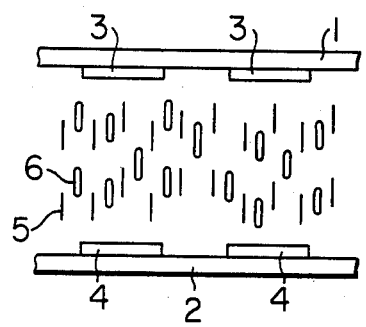
FIG. 1a and FIG. 1b are schematic views for explaining the principle of color liquid crystal display.
Figure 1B:
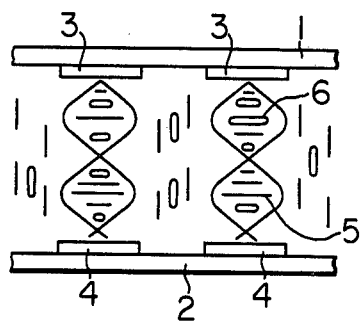
Figure 1C:
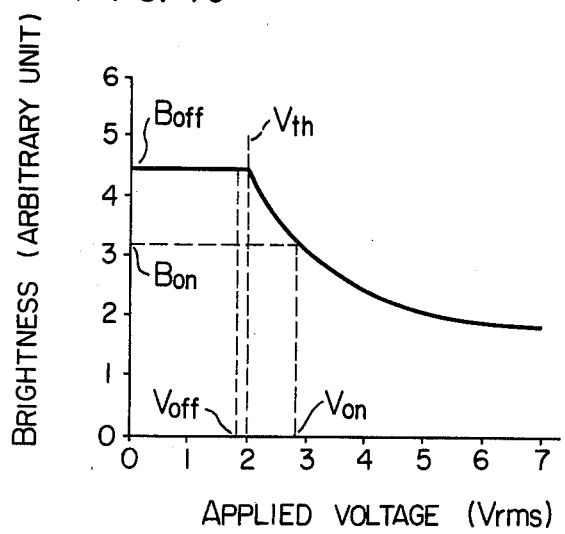
FIG. 1c is a characteristic curve diagram illustrating the relation between the applied voltage and the brightness of displayed image in the case that a liquid crystal display device is operated by time division driving by using voltage averaging method.
Figure 2:
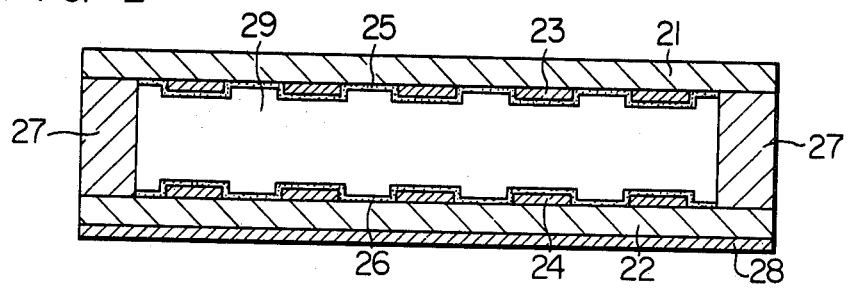
FIG. 2 is an outlined sectional view illustrating one example of color liquid crystal display device according to this invention.

In FIG. 2, numerals 21 and 22 are a pair of glass-made base plates arranged so as to face each other at a definite distance; numerals 23 and 24 are electrodes which are placed side by side in large numbers on each of the facing surfaces of the base plates 21 and 22; numerals 25 and 26 are oriented films formed by coating the whole surfaces of the base plates 21, 22 and the electrodes 23, 24 with dimethyldichlorosilane; numeral 27 is a spacer for fixing the distance between the base plates 21 and 22 and at the same time air-tightly closing the gap formed by the base plates 21 and 22; numeral 28 is a reflecting plate attached to the base plate 22 which is opposite to the side acting as display surface; and numeral 29 is a liquid crystal layer placed in the gap between the base plates 21 and 22. The liquid crystal layer comprises a nematic liquid crystal composition having a negative dielectric anisotropy to which a dichroic dye and an optically active substance have been added. That is, as the nematic liquid crystal composition having a negative dielectric anisotropy, there were used the following materials:

(a) 4-ethoxyphenyl-4'-n-pentylcyclohexylcarboxylate—28% by wt.
(b) 4-pentyloxyphenyl-4'-n-pentylcyclohexylcarboxylate—28% by wt.
(c) 4-propyloxyphenyl-4'-n-pentylcyclohexylcarboxylate—28% by wt.
(d) 4-butoxy-2,3-dicyanophenyl-4'-n-pentylcyclohexyl-carboxylate—8% by wt.
(e) 4-pentyloxy-2,3-dicyanophenyl-4'-n-pentylcyclohexylcarboxylate—8% by wt.

As the dichloric dye, there was used an anthraquinone dye represented by the following chemical formula (trade name D-16 manufactured by BDH Co., Great Britain);

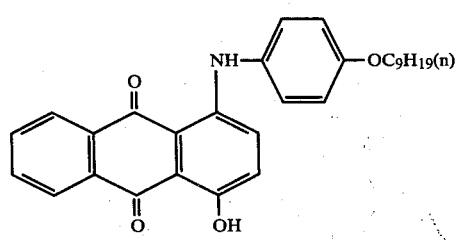

Figure 3:
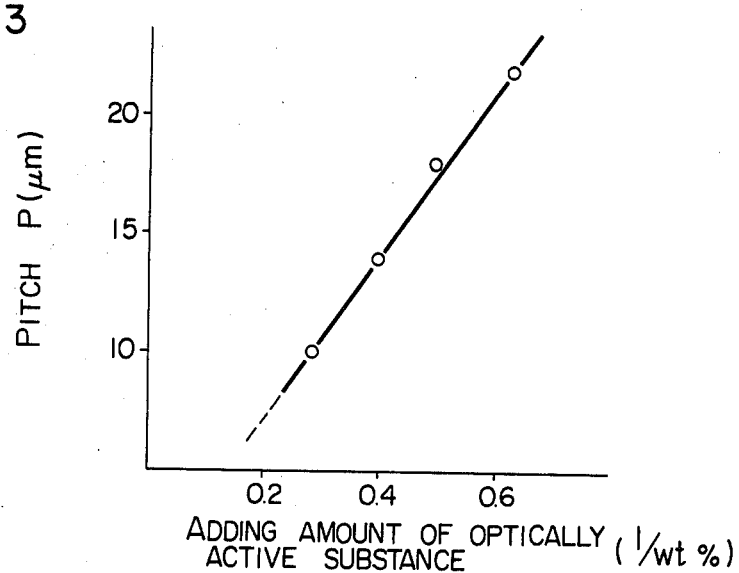
FIG. 3 is a characteristic curve diagram illustrating the relation between the amount of optically active substance added and the pitch of liquid crystal in cholesteric state in Example 1.
Figure 4:
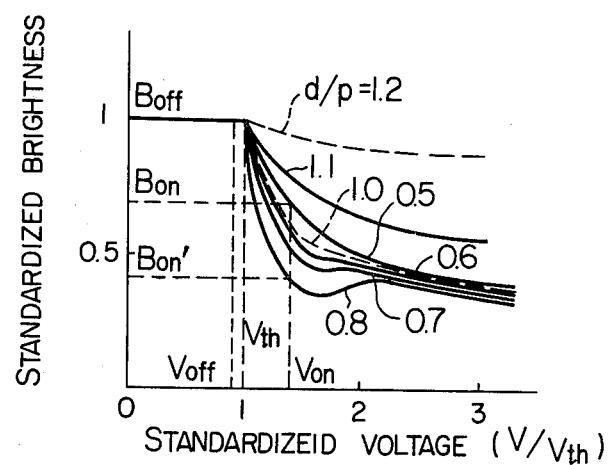
FIG. 4 is a characteristic curve diagram wherein the relation between the voltage applied and the brightness of displayed image in Example 1 is normalized and expressed by using d/P as a parameter.
Figure 5:
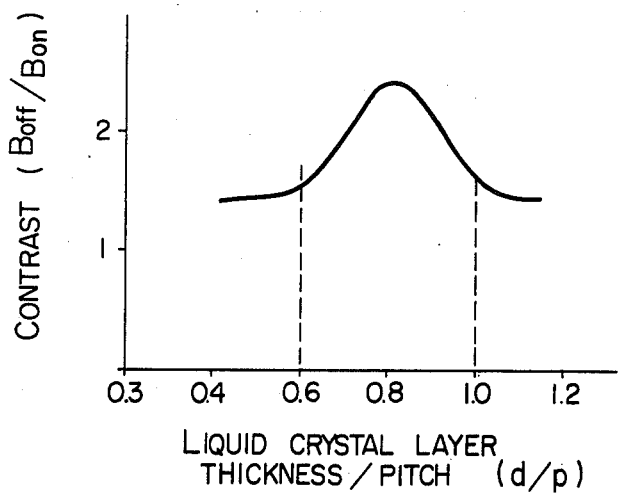
FIG. 5 is a characteristic curve diagram wherein the relation between d/P and the contrast of displayed image is given on the basis of FIG. 4.

As the optically active substance, there was used 2-methylbutyl-4-(4-hexyloxybenzoyloxy)-benzoate (trade name S-1082 manufactured by Merck Co., West Germany). The dichroic dye was added in an amount of 3% by weight, while the optically active substance was added in an amount varied in the range of 5.0–1.7% by weight in order to grasp the relation between the pitch of liquid crystal in cholesteric state and the amount of optically active substance added. The relation between the amount of optically active substance and pitch P is shown in FIG. 3 which demonstrates that pitch P decreases with an approximate linearity as the amount of optically active substance added increases. Then, the relation between the voltage applied and the brightness of displayed image was investigated by using liquid crystals having varied pitch P or by using liquid crystals to which varied amount of optically active substance was added. The results are shown in FIG. 4 with d/P as a parameter (d is thickness of liquid crystal layer between the pair of electrodes, which was 8 μm in this example). From this drawing, it is clear that the threshold voltage characteristic curve becomes steep in a particular range of d/P. The relation between d/P and contrast $B_{off}/B_{on}$ can be determined from FIG. 4, and the results are shown in FIG. 5. It is clear from FIG. 5 that a high contrast is given when d/P is in the range of 0.6–1.0 and the contrast drops when d/P is out of said range.

EXAMPLE 2

Figure 6:
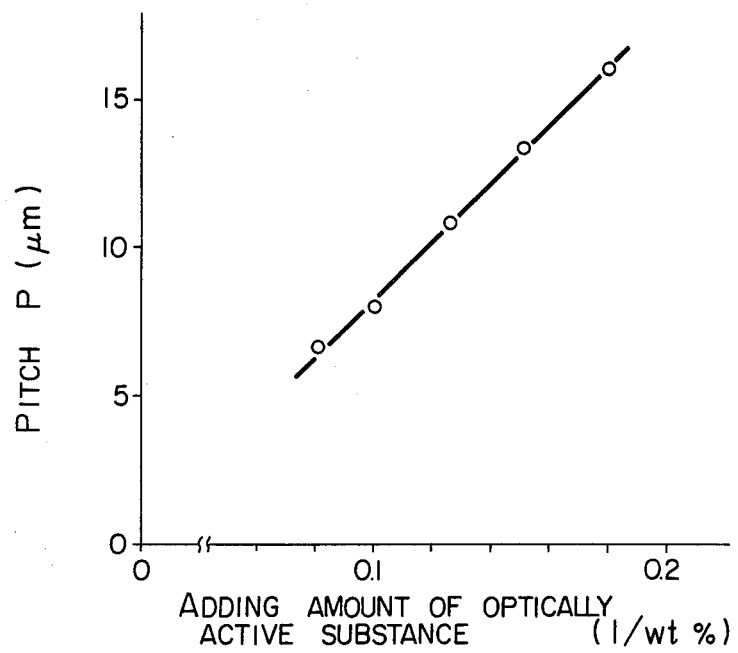
FIG. 6 is a characteristic curve diagram illustrating the relation between the amount of optically active substance added and the pitch of liquid crystal in cholesteric state in Example 2.

The same liquid crystal display device as shown in FIG. 2 was used. As the nematic liquid crystal composition, a 50:50 (by weight) mixture of 4-methoxybenzylidene-4'-butylaniline and 4-ethoxybenzylidene-4'-butylaniline was used, to which were added S-(4-cyanophenyl)-4-(2-methylbutoxy)-thiobenzoate as an optically active substance and the same dye as in Example 1 as a dichroic dye. The dichroic dye was added in an amount of 3% by weight, while the optically active substance was added in an amount varied in the range of 12.5–5.6% by weight. As shown in FIG. 6, the relation between the amount of optically active substance added and the pitch P had the same tendency as in FIG. 3. Then, the relation between the voltage applied and the brightness of displayed image was investigated by using liquid crystals having varied pitch P, and the results obtained were the same as in FIG. 4. Accordingly, the relation shown in FIG. 5 can also be held in this example and a high contrast is given when d/P is in the range of 0.6–1.0.

This invention is not limited to the above-mentioned examples, but various modifications are possible within the scope of the inventive idea of this invention.

What is claimed is:

1. A liquid crystal display device comprising a pair of base plates facing each other at a predetermined distance, a plurality of electrodes formed on the facing surfaces of the base plates, a liquid crystal layer placed between the base plates and means for orienting perpendicularly liquid crystal molecules provided to at least the electrode portions contacting with the liquid crystal layer, and means for driving said device by time division driving using the voltage averaging method, the liquid crystal layer comprising one or more nematic liquid crystals having a negative dielectric anisotropy, one or more dichroic dyes and one or more optically active substances, and a ratio of the thickness of the liquid crystal layer (d) to the pitch (P) in cholesteric state, d/P, being in the range of 0.6 to 1.0, whereby a liquid crystal display device having a displayed image of high contrast can be achieved.

2. A liquid crystal display device according to claim 1, wherein the nematic liquid crystal is one member or a mixture of two or more members selected from the group consisting of 4,4'-methoxybutyl-azoxybenzene, 4,4'-ethoxybutyl-azoxybenzene, 4-methoxyphenyl-4'-pentylbenzoate, 4-ethoxyphenyl-4'-pentylbenzoate, 4-ethoxyphenyl-4'-n-pentylcyclohexylcarboxylate, 4-pentyloxyphenyl-4'-n-pentylcyclohexylcarboxylate, 4-propyloxyphenyl-4'-n-pentylcyclohexylcarboxylate, 4-methoxybenzylidene-4'-butylaniline, 4-ethoxybenzylidene-4'-butylaniline, 4-butoxy-2,3-dicyanophenyl-4'-n-pentylcyclohexylcarboxylate and 4-pentyloxy-2,3-dicyanophenyl-4'-n-pentylcyclohexylcarboxylate.

3. A liquid crystal display device according to claim 1, wherein said dichroic dye is selected from the following dyes:

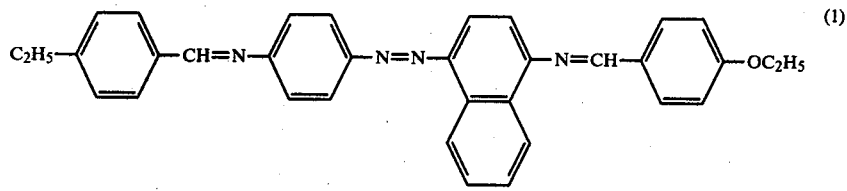 (1)

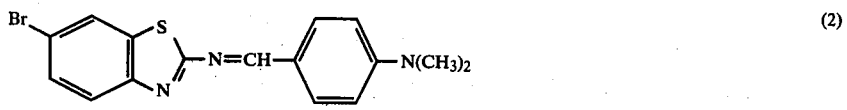 (2)

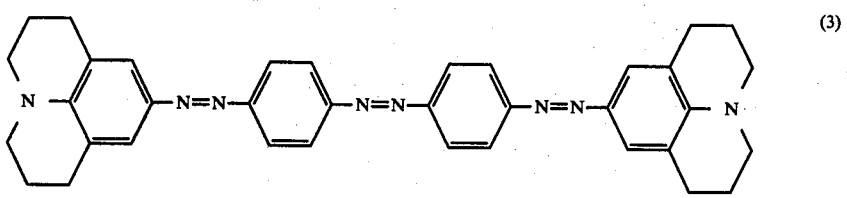 (3)

 (4)

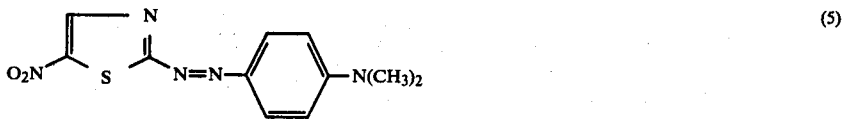 (5)

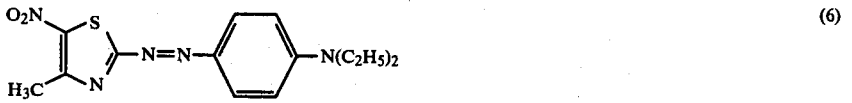 (6)

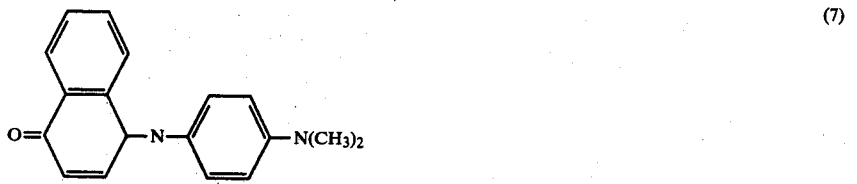 (7)

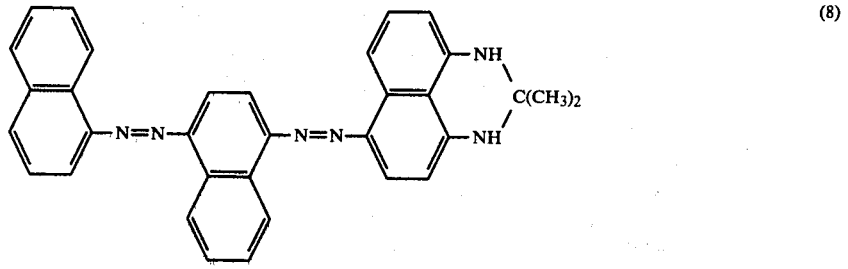 (8)

-continued
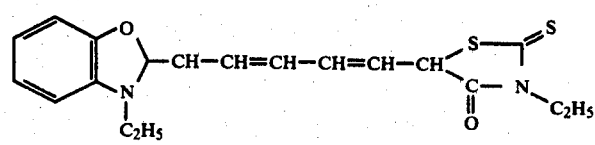 (9)
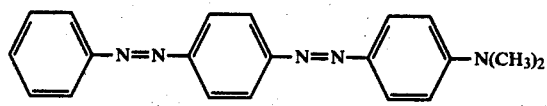 (10)
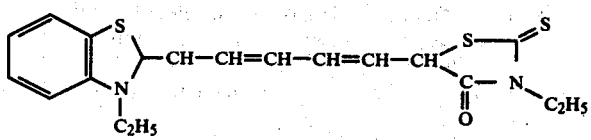 (11)
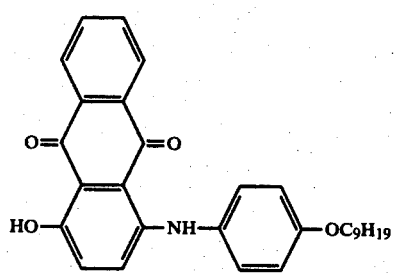 (12)
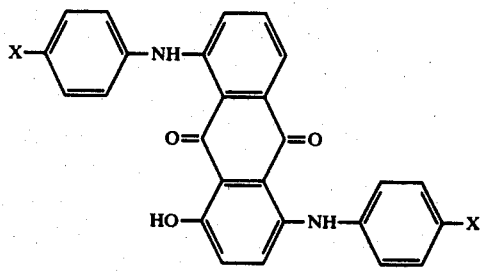 (13)
$X = -C_2H_5$
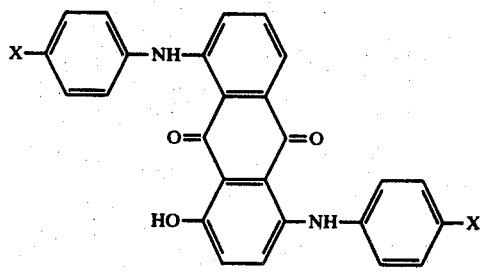 (14)
$X = -OC_5H_{11}$

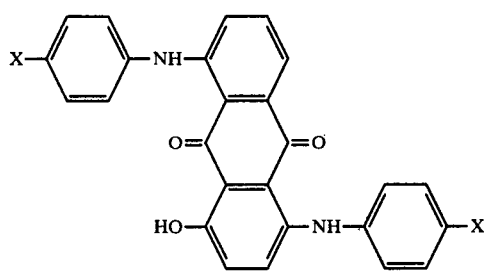

X = —N(CH₃)₂

4. A liquid crystal display device according to claim 3, wherein said dichroic dye is added in an amount of 0.5-5% by weight based on the total weight of the liquid crystal layer.

5. A liquid crystal display device according to claim 1, wherein the optically active substance is at least one member selected from the group consisting of chiral nematic compounds, alcohol derivatives, ketone derivatives and carboxylic acid derivatives.

6. A liquid crystal display device according to claim 1, wherein said means for driving said device includes means for applying a voltage to arbitrarily selected image elements which have been selected successively and for keeping constant a ratio of the applied voltage $V_{on}$ for the image elements to be displayed to the applied voltage $V_{off}$ for the image elements not to be displayed.

* * * * *